United States Patent [19]

Subramaniam

[11] 4,399,467
[45] Aug. 16, 1983

[54] METHOD AND APPARATUS FOR IMAGE DATA COMPRESSION AND DECOMPRESSION

[75] Inventor: Ambati Subramaniam, Plano, Tex.

[73] Assignee: NCR Canada Ltd., Mississauga, Canada

[21] Appl. No.: 310,017

[22] Filed: Oct. 13, 1981

[51] Int. Cl.³ .............................................. H04N 1/00
[52] U.S. Cl. .................................. 358/261; 358/262; 340/347 DD
[58] Field of Search ............... 358/261, 262, 260, 133, 358/138; 340/347 DD; 364/515; 375/17

[56] References Cited

U.S. PATENT DOCUMENTS

| | | | |
|---|---|---|---|
| 3,993,862 | 11/1976 | Karr | 178/6 |
| 4,056,828 | 11/1977 | Furuta | 358/133 |
| 4,070,694 | 1/1978 | Sakamoto et al. | 358/261 |
| 4,096,520 | 6/1978 | Furuta | 358/133 |
| 4,096,526 | 6/1978 | Furuta | 358/133 |
| 4,136,363 | 1/1979 | Saran | 358/261 |
| 4,163,260 | 7/1979 | Hisao et al. | 358/261 |
| 4,254,438 | 3/1981 | Yamazaki et al. | 358/261 |

OTHER PUBLICATIONS

U.S. Pat. appln. Ser. No. 269,237, filed Jun. 1, 1981, "Image Reduction System", by Robert S. Moore et al.
U.S. Pat. appln. Ser. No. 303,676, filed Sep. 18, 1981, "Data Decompression Apparatus and Method", by Robert S. Moore.

*Primary Examiner*—John C. Martin
*Assistant Examiner*—Edward L. Coles
*Attorney, Agent, or Firm*—J. T. Cavender; Albert L. Sessler, Jr.; George Jameson

[57] ABSTRACT

A data compression system which generates several types of symbols from bands of data derived from the digital image. Each group of data bits located in the same bit position across the data band is represented by a mode symbol, which signifies the decimal value of the binary combination of the data contained in that group. The mode symbol is followed by a run symbol, which represents the number of times or incremental positions that the same mode occurs successively until a different mode is generated. Mode and run symbols are transmitted in alternation, with each mode symbol followed by its corresponding run symbol, to an encoder, which generates variable length code words that are transmitted to a receiving station and decoded to provide symbols which are used to form a facsimile image. In one embodiment of this system, the mode and run symbols are combined to form a different type of symbol, known as a ternary octade symbol, to further improve the compression performance of the system.

27 Claims, 14 Drawing Figures

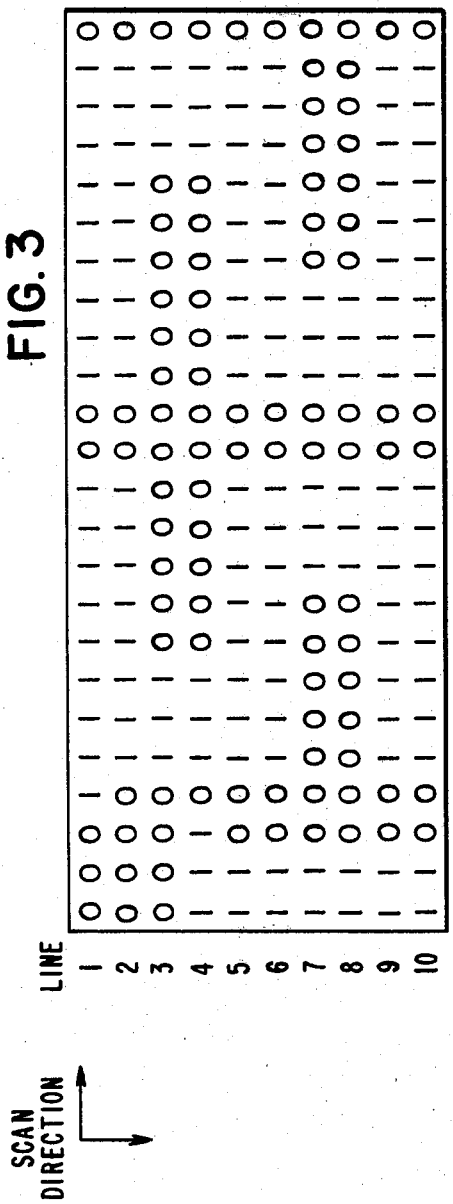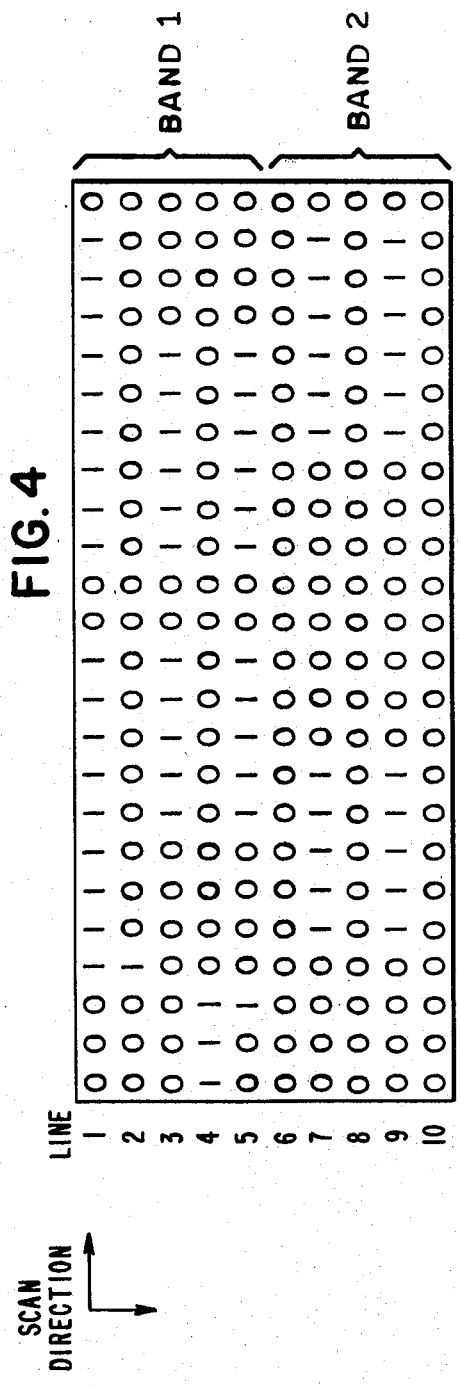

FIG. 10

| ADDRESS | | | | | CONTENTS | | |
|---|---|---|---|---|---|---|---|
| $A_5$ | $A_4$ | $A_3$ | $A_2$ | $A_1$ | $O_1$ | $O_2$ | $O_3$ |
| 0 | 0 | 0 | 0 | 0 | 0 | 0 | 0 |
| 0 | 0 | 0 | 0 | 1 | 0 | 0 | 0 |
| 0 | 0 | 0 | 1 | 0 | 0 | 1 | 0 |
| 0 | 0 | 0 | 1 | 1 | 0 | 0 | 0 |
| 0 | 0 | 1 | 0 | 0 | 1 | 0 | 0 |
| 0 | 0 | 1 | 0 | 1 | 0 | 1 | 0 |
| 0 | 0 | 1 | 1 | 0 | 0 | 0 | 1 |
| 0 | 0 | 1 | 1 | 1 | 0 | 0 | 0 |
| 0 | 1 | 0 | 0 | 0 | 0 | 1 | 0 |
| 0 | 1 | 0 | 0 | 1 | 0 | 0 | 1 |
| 0 | 1 | 0 | 1 | 0 | 1 | 0 | 1 |
| 0 | 1 | 0 | 1 | 1 | 0 | 0 | 0 |
| 0 | 1 | 1 | 0 | 0 | 0 | 0 | 0 |
| 0 | 1 | 1 | 0 | 1 | 0 | 0 | 0 |
| 0 | 1 | 1 | 1 | 0 | 0 | 0 | 0 |
| 0 | 1 | 1 | 1 | 1 | 0 | 0 | 0 |
| 1 | 0 | 0 | 0 | 0 | 1 | 0 | 0 |
| 1 | 0 | 0 | 0 | 1 | 0 | 1 | 0 |
| 1 | 0 | 0 | 1 | 0 | 0 | 0 | 1 |
| 1 | 0 | 0 | 1 | 1 | 0 | 0 | 0 |
| 1 | 0 | 1 | 0 | 0 | 0 | 1 | 0 |
| 1 | 0 | 1 | 0 | 1 | 0 | 0 | 1 |
| 1 | 0 | 1 | 1 | 0 | 1 | 0 | 1 |
| 1 | 0 | 1 | 1 | 1 | 0 | 0 | 0 |
| 1 | 1 | 0 | 0 | 0 | 0 | 0 | 1 |
| 1 | 1 | 0 | 0 | 1 | 1 | 0 | 1 |
| 1 | 1 | 0 | 1 | 0 | 0 | 1 | 1 |
| 1 | 1 | 0 | 1 | 1 | 0 | 0 | 0 |
| 1 | 1 | 1 | 0 | 0 | 0 | 0 | 0 |
| 1 | 1 | 1 | 0 | 1 | 0 | 0 | 0 |
| 1 | 1 | 1 | 1 | 0 | 0 | 0 | 0 |
| 1 | 1 | 1 | 1 | 1 | 0 | 0 | 0 |

METHOD AND APPARATUS FOR IMAGE DATA COMPRESSION AND DECOMPRESSION

BACKGROUND OF THE INVENTION

This invention relates generally to a method and apparatus for data compression and, in particular, to a novel method and apparatus for reducing the number of bits of information needed to transmit a video image by using a technique which generates symbols from bands of data taken from the original image.

In the transmission of digital data, it is desirable to reduce the data to be transmitted as much as possible in order to reduce the bandwidth requirements of transmission medium and storage requirements. One technique which has proven useful in compacting digital image data is known as run length encoding. This particular technique consists of partitioning each row (scan line) of the image or array into a sequence of runs, with each run (including one or more adjacent picture elements, called pixels, with the same binary value, and representing each run with a symbol or code which specifies the length of the run. Often, these symbols are represented by variable length codes, such as a Huffman code set, and are assigned such that the shorter code words are used to represent the symbols which are more likely to occur, and the longer code words are transmitted for symbols which rarely appear.

However, it is possible to employ the run length concept in a different manner to develop a novel scheme for achieving improved data compression performance. This novel scheme is combined with an additional technique which groups together binary representations of different symbols, formed from data elements, to devise a different approach to efficient data compression.

SUMMARY OF THE INVENTION

It is therefore an object of the present invention to provide a novel method and apparatus for data compression which is easily implemented in hardware and at low cost.

Another object of the present invention is to provide a method for compressing digital data in which a form of novel run length coding technique is combined with a second technique to further improve compression performance.

These and other objects are accomplished in the present instance by using a novel encoding apparatus and method which, when implemented by conventional hardware devices, compresses data representative of facsimile images with a high degree of efficiency. The compression method is based upon dividing the image into data bands from which two symbols, called modes and runs, are derived. The actual binary representations of these symbols may also be combined to form a different type of symbol, such as a ternary octade symbol, which is encoded using a variable length coding system and transmitted to a decompressor.

BRIEF DESCRIPTION OF THE DRAWINGS

FIG. 3 shows the visual representation of FIG. 2 in which the two-valued picture elements are replaced by ones and zeroes.

FIG. 4 shows a visual representation of the scan lines of FIG. 3 in which the data contained in each scan line has been EXCLUSIVE-ORed with the preceding scan line and is divided into two bands.

FIG. 10 is a chart listing the PROM contents of the PROMs used in the MODULO-3 adder circuitry.

DESCRIPTION OF THE PREFERRED EMBODIMENT

It is well-known that an image may be divided into a series of rows of data elements of different types, such as black and white colors, which can be scanned by a device having an elemental area resolution enabling it to distinguish between the black and white elemental areas. The output of this scanning device is in digital form in which the white elements normally cause a zero output signal to be generated and the black elements produce a one output signal.

Figure 1:
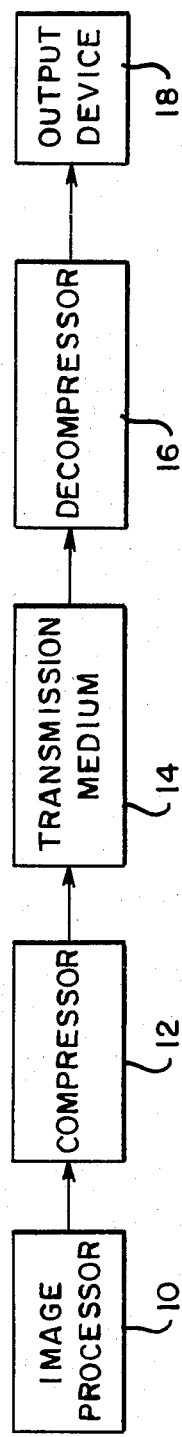
FIG. 1 is a block diagram of a data transmission system suitable for use with the present invention.

Data in this form can be compressed and conveyed via a transmission network to a remote receiver which will reconstruct the data to form a facsimile image. FIG. 1 shows the overall arrangement of a typical facsimile transmission system in which this can be accomplished. However, it is desirable to encode the data so that the image can be reconstructed by transmitting the fewest bits possible.

Referring now to FIG. 1, an image lift unit and processor 10 scans a document which is to be transmitted and converts the original image data into strings of 1's and 0's. Image processor 10 in the present embodiment is a flying spot scanner of well-known construction, although another type of scanning system may be employed to provide the required data output. The data is sent in this form to a compressor 12, where it is transformed into a series of variable-length code words, and then transmitted over a transmission medium 14. The data is received at the other end of medium 14 by a decompressor 16, where it is reconverted, from the variable length code words, into the original image and then transmitted to an output device 18, such as a CRT screen, where a reconstructed image of the original can be displayed.

The method of the present invention divides the image data into "modes" and "runs". A mode is the decimal value of the binary combination of the data contained in each of the corresponding bit positions in each line of a data band consisting of several scan lines, running across the image, and a run is the number of times (or incremental positions) that the same mode occurs successively until it changes to a different mode.

The horizontal redundancy in image data is reduced by performing an EXCLUSIVE-ORing operation, on a pixel-by-pixel basis, on corresponding pixels located in successive lines. This operation, also known as MODULO-2 or data coding, further improves the compression ratio in the present embodiment. In the present embodiment, a band is composed of a 24 pixel/line by 5 line group of data elements.

A buffer is used to store five lines of image data after the original data of each line has undergone the MODULO-2 operation. When this five line buffer is full, the compressor reads the data from the buffer (across the five line band) and generates modes and runs for the five line band.

In the present embodiment, as the compressor is reading the data contained in the buffer, additional input data outputted from the EXCLUSIVE-OR gate used in the MODULO-2 operation is simultaneously written into a second five line buffer. This read/write operation is switched between the two buffers for every five scan lines.

Each of the modes generated in the present embodiment is five bits and each of the runs generated is ten bits long; thus, the values of the modes generated are from 0 to 31 and the runs are from 1 to 1023. However, the ternary conversion of the present embodiment requires that the minimum allowable value be equal to 1. Thus, the value of each mode must be incremented by 1. Therefore, for a five line band with a maximum length of 1023, the modes generated will have values between 1 to 32 (1 to 6 bits) and the runs between 1 to 1023 (1 to 10 bits). Each of the modes and runs are then converted into actual binary lengths; thus, for each mode and run, all most significant zero bits are rejected so that the most significant bit of modes and runs will always be a one.

The resulting binary data generated by the runs and modes is converted into ternary digits. A ternary digit is represented by one of three values; 0, 1, or 2. The following rules are used to convert the data:
(1) All binary 1's of modes are replaced by a ternary digit 2;
(2) All binary 1's of runs are replaced by a ternary digit 0; and
(3) All binary 0's of both runs and modes are replaced by a ternary digit 1.

In addition, two special cases are handled in the following manner:
(1) If, at the end of the band, the ternary octade symbol is not generated, the ternary digits of the next band are used to generate the octade symbol.
(2) If, at the end of the last band of the image, there are not enough ternary digits to generate an octade symbol, the octade symbol is generated using ternary zeroes in the remaining positions of the octade symbol.

Figure 2:
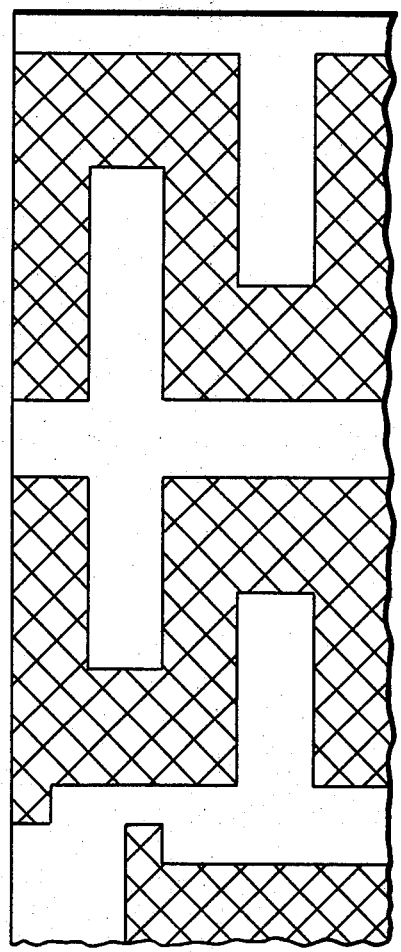
FIG. 2 shows a graphical visual representation of several scan lines of two-valued picture elements taken from a sample image.

FIG. 2 is a representation of ten lines of data taken from a digital image. FIG. 3 is a binary representation of these same ten scan lines of data. The horizontal redundancy in this data is reduced by performing a MODULO-2 or EXCLUSIVE OR operation between successive scan lines. FIG. 4 is a representation of the digital data after the MODULO-2 operation has been performed.

In the present embodiment, each band to be examined is five pixels wide, taken from five successive scan lines. Thus, the data of FIG. 4 is divided into BAND1 and BAND2. Each vertical column of data in BAND1 and BAND2 represents the binary value of a mode, with the lowest line number in each band containing the most significant digit and the highest line number containing the least significant digit. For example, the first vertical column of BAND1 in FIG. 4 contains the binary value 00010, which represents a decimal value of 2. The next vertical column also contains the value 00010, increasing the run value for this mode to 2. This process continues until a different mode value is encounterd, at which time a new run count is started.

Referring again to FIG. 4, it can be seen that the modes and runs of BAND1 and the first four columns of BAND2 can be written in this manner (mode, run);
2,2; 3,1; 24,1; 16,3; 21,5; 0,2; 21,6; 16,3; 0,5
The remaining data in BAND2 can be divided into modes and runs in this manner;
10,5; 0.8; 10,6; 0,1
Incrementing the modes by 1, the following modes and runs are obtained:
BAND1: 3,2,4,1,25,1,17,3,22,5,1,2,22,6,17,3,1,5
BAND2: 11,5,1,8,11,6,1,1
Each of the modes and runs are then converted into their actual binary numbers:
BAND1:
11,10,100,1,11001,1,10001,11,10110,101,1,10, 10110,110,10001,11,1,101
BAND2: 1011,101,1,1000,1011,110,1,1
The binary numbers are then converted to ternary coded numbers using the rules which were discussed previously: 'BAND1:
22,01,211,0,22112,0,21112,00,21221,010,2,01, 21221,001,21112,00,2,010
BAND2: 2122,010,2,0111,2122,001,2,0
These numbers are used to form the ternary octade symbols by grouping them into eight digit groups:
22012110, 22112021, 11200212, 21010201, 21221001, 21112002, 01021220, 10201112, 12200120
Each ternary digit in an octade symbol requires two bits in binary representation. Thus, a ternary octade symbol, in binary form, contains sixteen bits. These octade symbols may also be represented in a binary form:

| 1010000110010100, | 1010010110001001, |
| 0101100000100110, | |
| 1001000100100001, | 1001101001000001, |
| 1001010110000010, | |
| 0001001001101000, | 0100100001010110, |
| 0110100000011000 | |

However, if the ternary octade symbols are converted directly to decimal numbers, these symbols will generate decimal values between 0 and 6560. If these decimal values are then converted to binary numbers, only thirteen bits are needed for this representative. To derive these decimal values, each ternary digit is multiplied by its weighted ternary value, with the least significant digit weight as $3^0$ and the most significant digit as $3^7$. Using this procedure, the decimal values of the ternary octade symbols are as follows:

| 5979 | 6217 | 3425 | 5203 |
| 5779 | 5483 | 942 | 2714 |
| 4146 | | | |

Thus, the above ternary octade symbols, using only thirteen bit representation, are as follows:

| 1011101011011 | 1100001001001 |
| 0110101100001 | 1010001010011 |
| 1011010010011 | 1010101101011 |

-continued

```
0001110101110        0101010011010
1000000110010
```

The sixteen bit octade symbols are converted into thirteen bit octade symbols by using a mapping technique which will subsequently be described in detail. These thirteen bit words are used to address the PROM which contains the Huffman code words which are grouped into bytes and sent to the decompressor.

Figure 5:
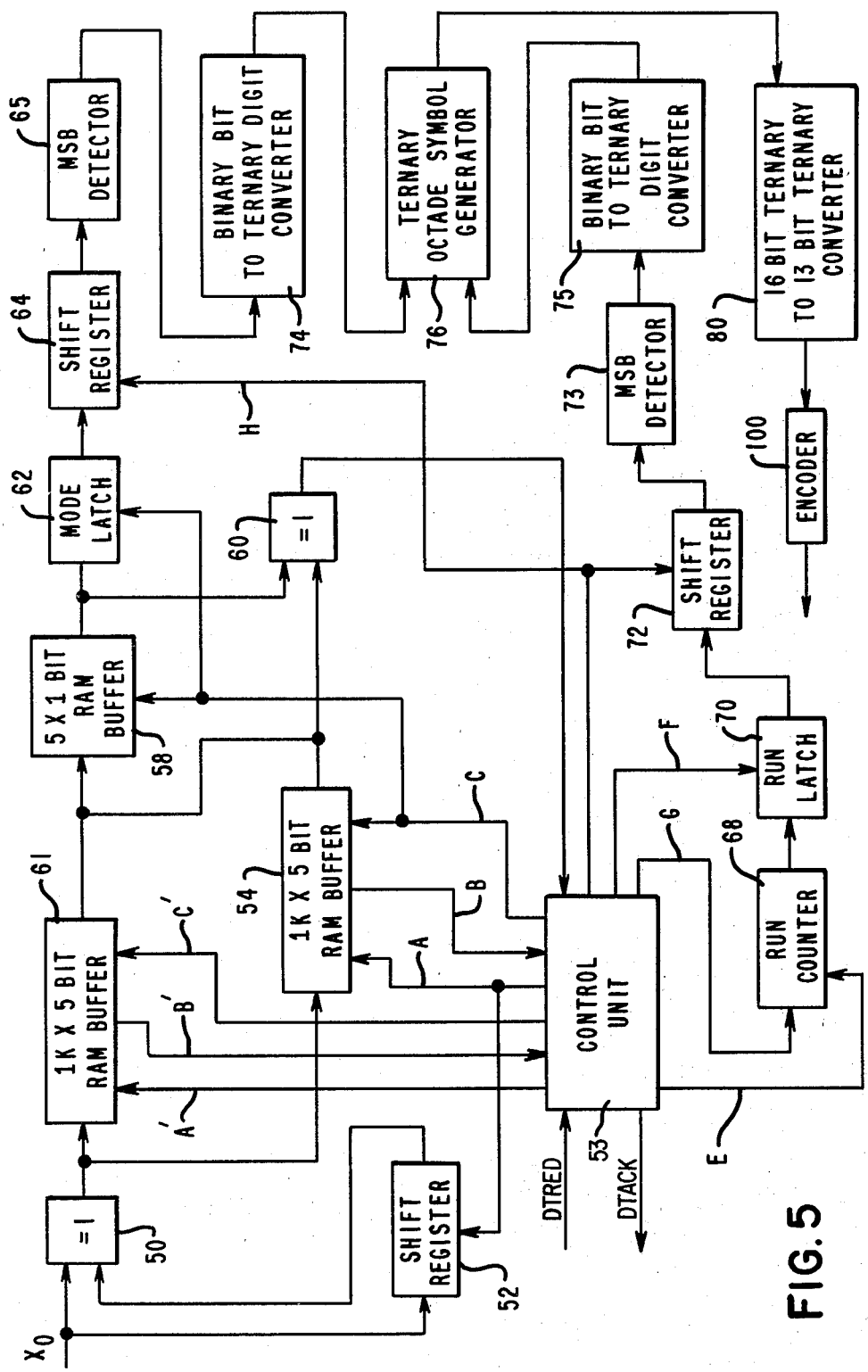
FIG. 5 shows the circuitry for the compressor hardware used in the preferred embodiment.

Referring now to FIG. 5, each original pixel $X_0$ is outputted serially from image processor 10 (FIG. 1) and is transmitted to an EXCLUSIVE OR gate 50, and also to a shift register 52. Shift register 52, which is selected such that its length is equal to the number of pixels contained in one scan line of data from the original image, delays each pixel so that the MODULO-2 operation can be performed between pixels in the same bit position in adjacent scan lines. Control unit 53, which may be a field programmable logic array (FPLA) chip, provides all the timing and control signals for the compression hardware shown in FIG. 5. As each pixel $X_0$ is outputted from image processor 10, a signal A is transmitted to shift register 52 from control unit 53 to allow pixel $X_0$ of the previous scan line to shift the image data one position in register 52.

The output of EXCLUSIVE-OR gate 50 is transmitted to a 1K×5 bit random access memory (RAM) chip 54. RAM 54 acts as a buffer which stores five lines of data from the digitized image, which, according to the preferred embodiment of the present invention, constitutes a band of data. Control image A is also transmitted to RAM 54 from control unit 53, enabling the pixel outputted from gate 50 to enter RAM 54.

When RAM 54 has stored five scan lines of data, a signal B is transmitted to control unit 53. Control unit 53 then transmits a signal C to RAM 54, causing a five pixel parallel output, which represents a mode, to be read from RAM 54 into a 5×1 bit RAM buffer 58. The output of RAM 54, which consists of the last pixel in each of the five scan lines, is also transmitted to one input of an EXCLUSIVE OR gate 60. RAM 58 stores the five pixels in a 5×1 array and delays them one count so that they can be compared with the next group of five pixels from RAM 54 by gate 60, so that runs of identical modes can be accumulated. RAM 58 is also clocked by signal C from control unit 53.

In the present embodiment, after RAM 54 has stored the first five lines of data, pixels from the sixth scan line to the tenth scan line coming from gate 50 are stored into a second 1K×5 bit RAM buffer 61. The read operation (RAM 54) and write operation (RAM 61) are synchronized by control unit 53 such that when the compressor completes generating modes and runs from RAM 54, the next five scan lines (lines 6–10) of data were stored in RAM 61. Then, the read and write functions are switched between the two buffers, RAM 61 becomes a read buffer and RAM 54 becomes a write buffer for the next five scan lines (lines 11–15). This interchange continues until the complete image has been processed. The control signals A' and C' are generated by control unit 53 and operate RAM 61 in the same manner as RAM 54. Signal B' is transmitted to control unit 53 when RAM 61 has stored five lines of data.

The five bit mode output of RAM 58 is also transmitted to a mode latch 62, which is enabled by signal C from control unit 53. Mode latch 62, which stores data representing the mode, automatically increments the binary value of the mode by one. The output of latch 62 is transmitted to a five bit parallel in-serial out shift register 64. The output of register 64 is then sent to a most significant bit (MSB) detector 65, which detects a one in the most significant bit.

The five bit output of gate 60 is transmitted to control unit 53. If control unit 53 senses that the output of gate 60 is a zero, indicating that the current mode is identical to the previous mode, a signal E is transmitted by control unit 53 to a counter 68. Counter 68, a ten bit up counter, is incremented by signal E each time an identical mode is detected by gate 60. When any bit of the five bit output of gate 60 is a one, indicating that the current mode is a new quantity, the count is terminated, and the contents of counter 68 are clocked into a latch 70 by a signal F from control unit 53, which latch stores data representing the run. Counter 68 is then cleared by a signal G from control unit 53.

The output of run latch 70 is transmitted to a ten bit shift register 72. Register 72, a parallel in-serial out device which stores the run data for the corresponding mode which is stored in register 64, is coupled to a MSB detector 73. Control unit 53 transmits a signal H to clock data from registers 64 and 72 to their corresponding detectors.

Detector 65 detects the most significant (MSB) bit that is equal to one in the five bit mode from register 64, and then shifts out serially (from this most significant bit to the least significant bit) its contents to a binary-to-ternary digit converter 74. Detector 73 detects the most significant bit that is equal to one of the ten bit run from register 72, and then shifts out serially (from this most significant bit to the least significant bit) its contents to a binary-to-ternary digit converter 75. Detectors 65 and 73 insure that no leading zeroes are erroneously used to generate the ternary numbers.

Binary-to-ternary converters 74 and 75 transform the actual length binary data stored in registers 64 and 72 into ternary data. When the data in converter 72 has been modified, digit by digit, it is transmitted to a ternary octade symbol generator 76. After this data has been transferred, the data in converter 75, having been changed to ternary data, is transmitted to generator 76.

Each ternary octade symbol consists of 8 ternary digits, or 16 binary bits; therefore, when generator 76 has accumulated sixteen data bits, this number is transmitted in parallel to a sixteen bit-to-thirteen bit ternary octade converter 80. Converter 80 is required due to the fact that, although a ternary octade number exists in sixteen bit binary form, only thirteen bits are required for binary representation of its value. When the thirteen bit ternary octade number has been generated by converter 80, it is transmitted to an encoder 100 which generates code words for transmission to the decompressor 16 (FIG. 1). The operation of encoder 100 will be described subsequently in greater detail.

Figure 6A:
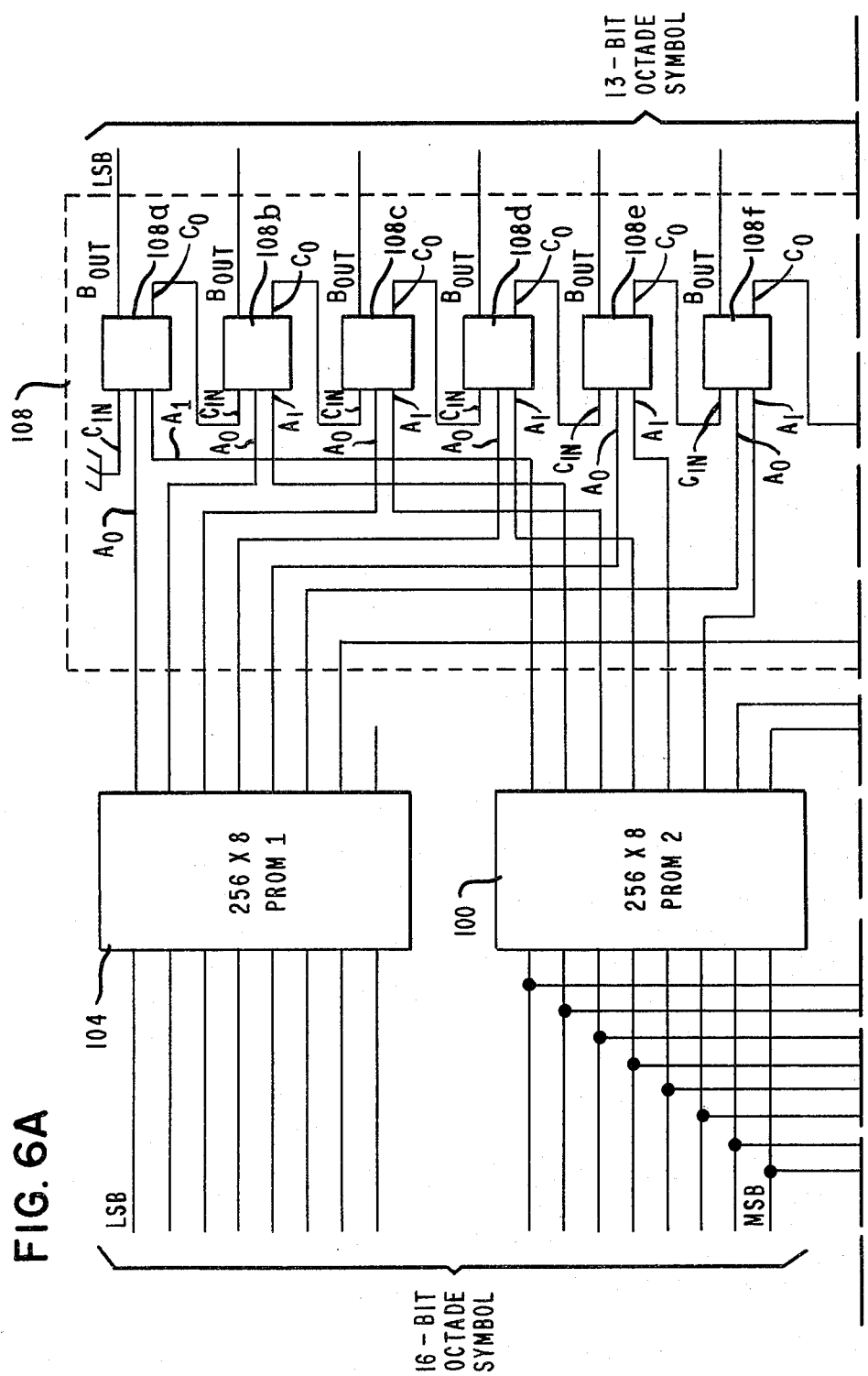
FIGS. 6A-B inclusive, taken together, show a detailed block diagram of the sixteen bit to thirteen bit ternary number generator used in the preferred embodiment.
Figure 6B:
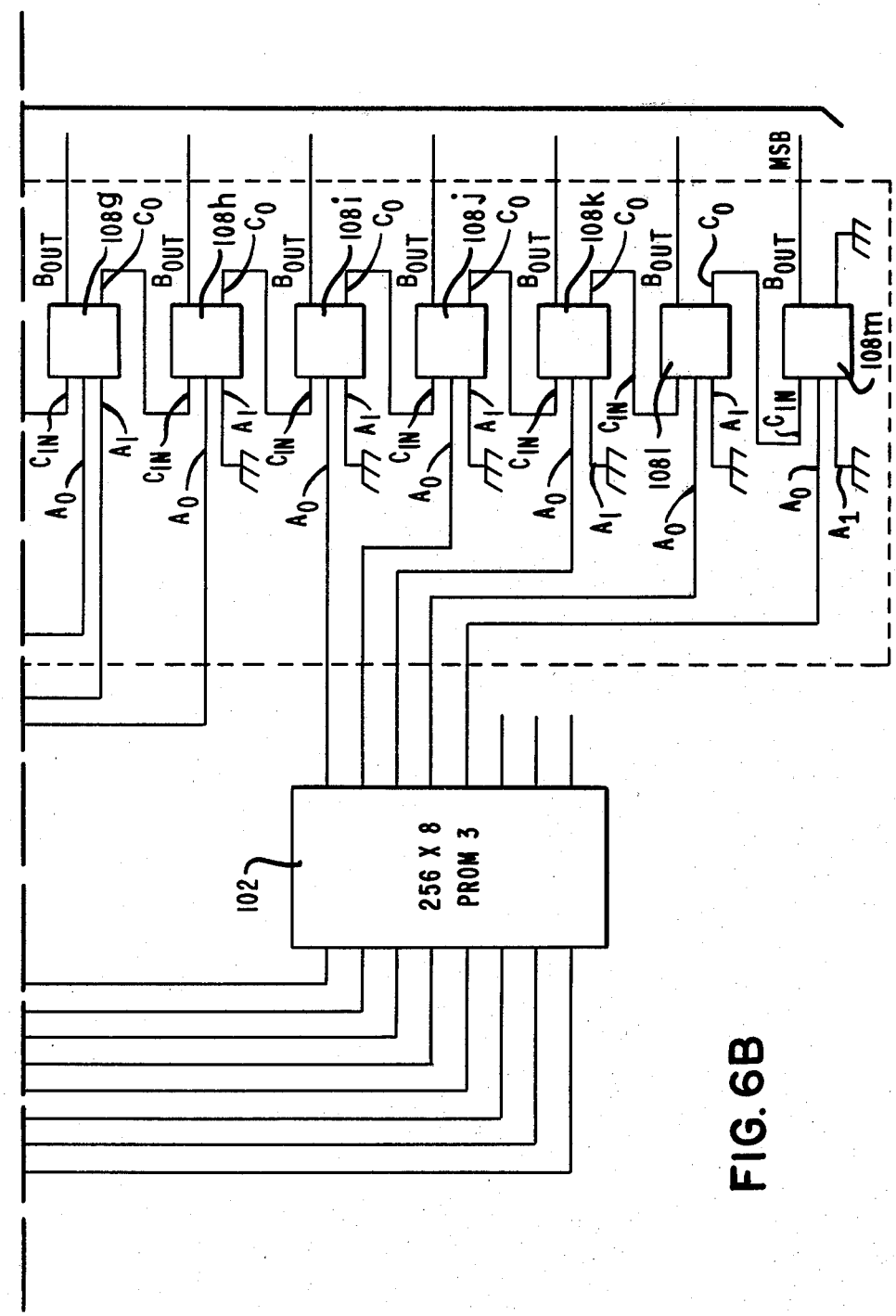

A detailed representation of converter 80 is shown in FIGS. 6A–B. Referring now to FIG. 6A, the eight most significant bits (MSB) of the sixteen bit ternary octade symbol, which represent the four most significant digits of the symbol, are transmitted in parallel from generator 76 (FIG. 5) to two 256×8 bit PROMs 100 and 102 (FIG. 6B), while the eight least significant bits representing the four least significant digits of the symbol are transmitted to a PROM 104, which also contains 256×8 bits.

The four least significant ternary digits (eight least significant bits) have values between 0 and 80, which necessitates only 7 bits for binary representation. However, since the binary representation of the four least significant ternary digits contains eight bits, an eight bit to seven bit mapping is performed by PROM 104, a 256×8 bit device, which uses eight bits as an address and outputs seven bits representing the actual decimal value of the four least significant ternary digits. The seven output bits from PROM 104 are transmitted to inputs of a thirteen bit adder 108.

The four most significant ternary digits (eight most significant bits) of the octade symbol have decimal values ranging from 81 to 6560, which necessitates thirteen bits for binary representation. Thus, since the binary representation of the four most significant ternary digits contains eight bits, an eight bit to thirteen bit mapping requires a device which has an eight bit address and a thirteen bit output. The preferred embodiment employs a pair of 256×8 bit PROMs 100 and 102 operating in parallel. The thirteen most significant output bits from PROMs 100 and 102 are applied to the adder 108.

The seven bit output of PROM 104 is logically added to the thirteen active outputs from PROMs 100 and 102 by adder 108, which consists of thirteen two-bit full adders, 108$a$-$m$, which may be of type SN7482 or an equivalent, to obtain as an output the thirteen bit representation of the inputted sixteen bit ternary octade symbol. Each two bit full adder consists of three inputs: ($C_{in}$(Carry In), $A_0$, and $A_1$) and two outputs ($C_O$(Carry Out), and $B_O$). The $C_O$ output of the lower bit adder is used as an input to the $C_{in}$ input port to the next higher bit adder. The thirteen $C_O$ output of adders 108$a$-$m$ constitute the thirteen bit ternary octade symbol, with the 108$m$ output representing the most significant bit and the 108$a$ output representing the least significant bit.

Figure 7:
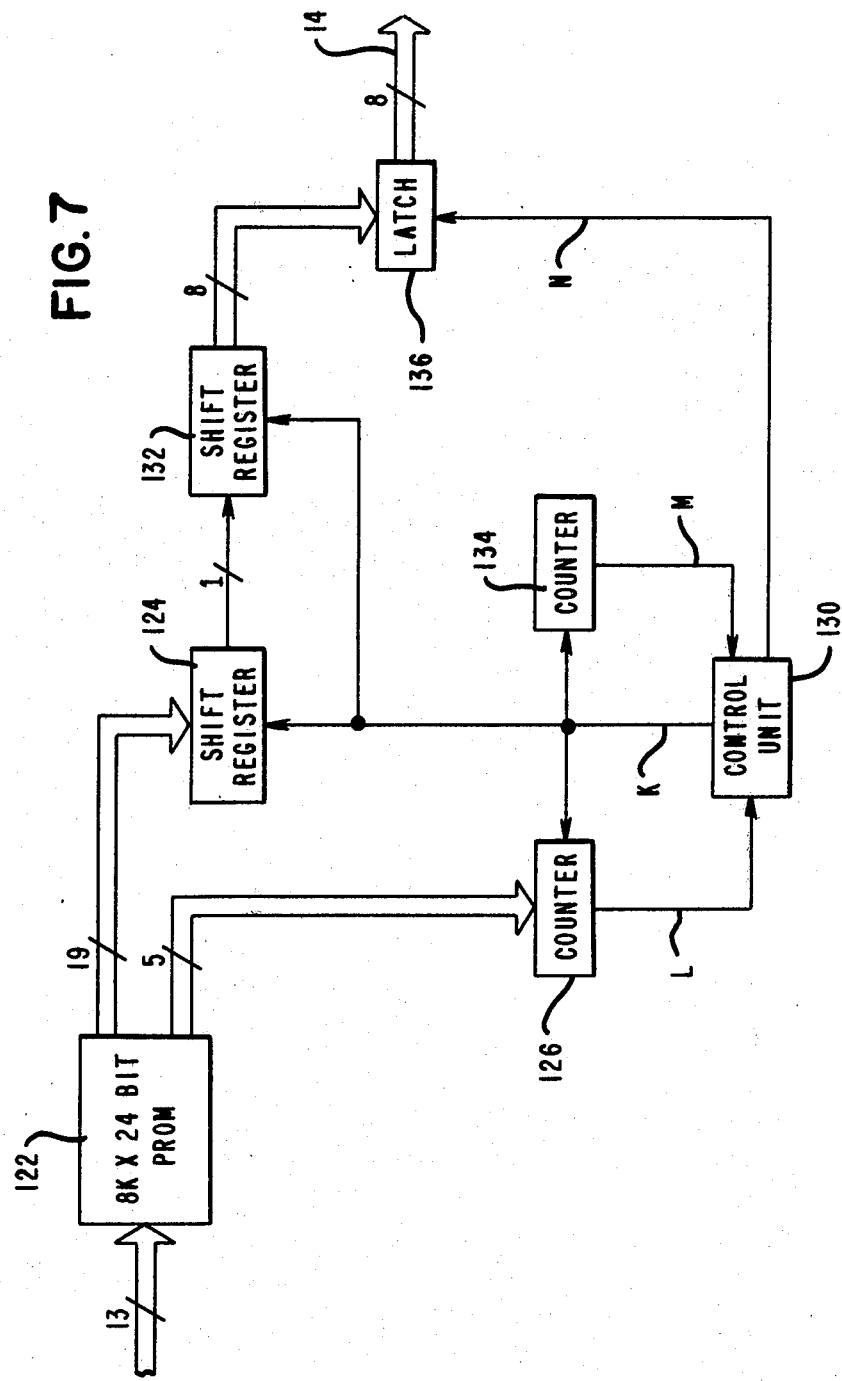
FIG. 7 shows a detailed block diagram of the encoder hardware used in the preferred embodiment.

Once the ternary octade symbol is mapped into a thirteen bit representation by converter 80, the thirteen bits are transmitted, as a thirteen bit address, to encoder 100 (FIG. 5), which outputs a nineteen bit code and its five bit length. A detailed representation of encoder 100 is shown in FIG. 7.

The thirteen bit output from adder 108 is transmitted to a PROM 122. PROM 122, an 8K×24 bit memory device, stores the variable length code words corresponding to the 6561 possible ternary octade symbols. The twenty four bit contents of PROM 122 consist of a nineteen bit code word and its five bit code length. The first nineteen bits are transmitted to a shift register 124. However, since the code words are variable in length, not all of the nineteen bits will be needed to represent each code word. Therefore, the last five bits of the output of PROM 122, which represent the length of the code word, are used to specify the number of bits actually to be used of the nineteen bit PROM output to form the code word. These five bits are loaded into a counter 126. Counter 126, a five bit down counter, is clocked by a signal K from a control unit 130, which signal also clocks shift register 124. Each time that signal K clocks shift register 124, which is a parallel in-serial out device, the contents of counter 126 (representing the number of bits in the code word) is decremented one count, and shift register 124 outputs one bit of data to a shift register 132, a serial inparallel out device which is also clocked by signal K. When counter 126 is clocked to zero, a signal L is transmitted to control unit 130, signifying that the complete code word stored in shift register 124 has been outputted to shift register 132.

Signal K is also transmitted to a three-bit up counter 134. Counter 134 is clocked by signal K until it receives eight pulses, at which time it transmits a signal M to control unit 130, signifying that an eight bit byte of data is contained in shift register 132. Control unit 130 then transmits a signal N to a latch 136, outputting the eight bit byte of data over transmission medium 14 (FIG. 1) to decompressor 16 (FIG. 1).

Figure 8A:
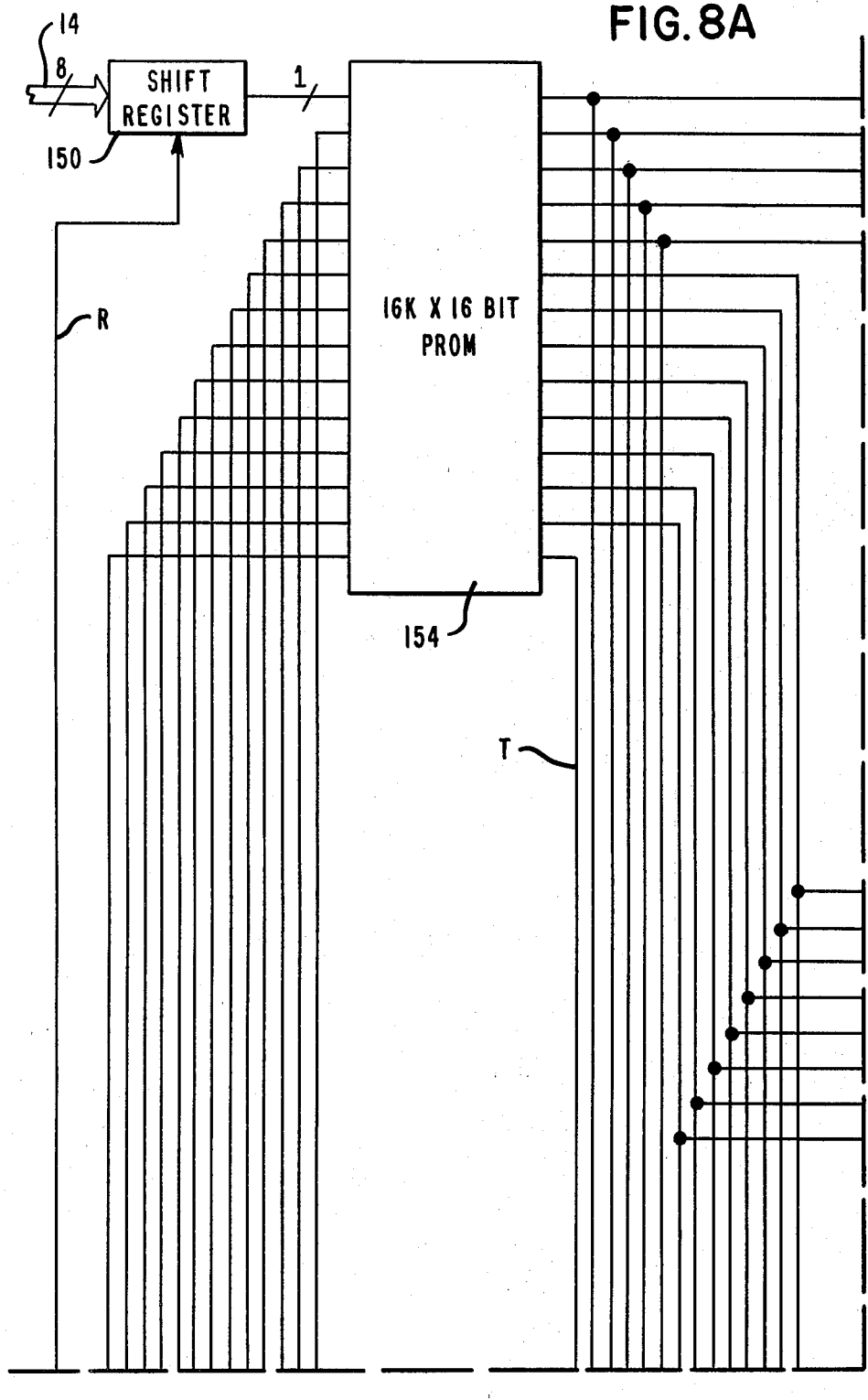
FIGS. 8A-D inclusive, taken together, show the circuitry for the decoding of the thirteen bit ternary symbol and its conversion to the sixteen bit ternary octade symbol used in the preferred embodiment.
Figure 8B:
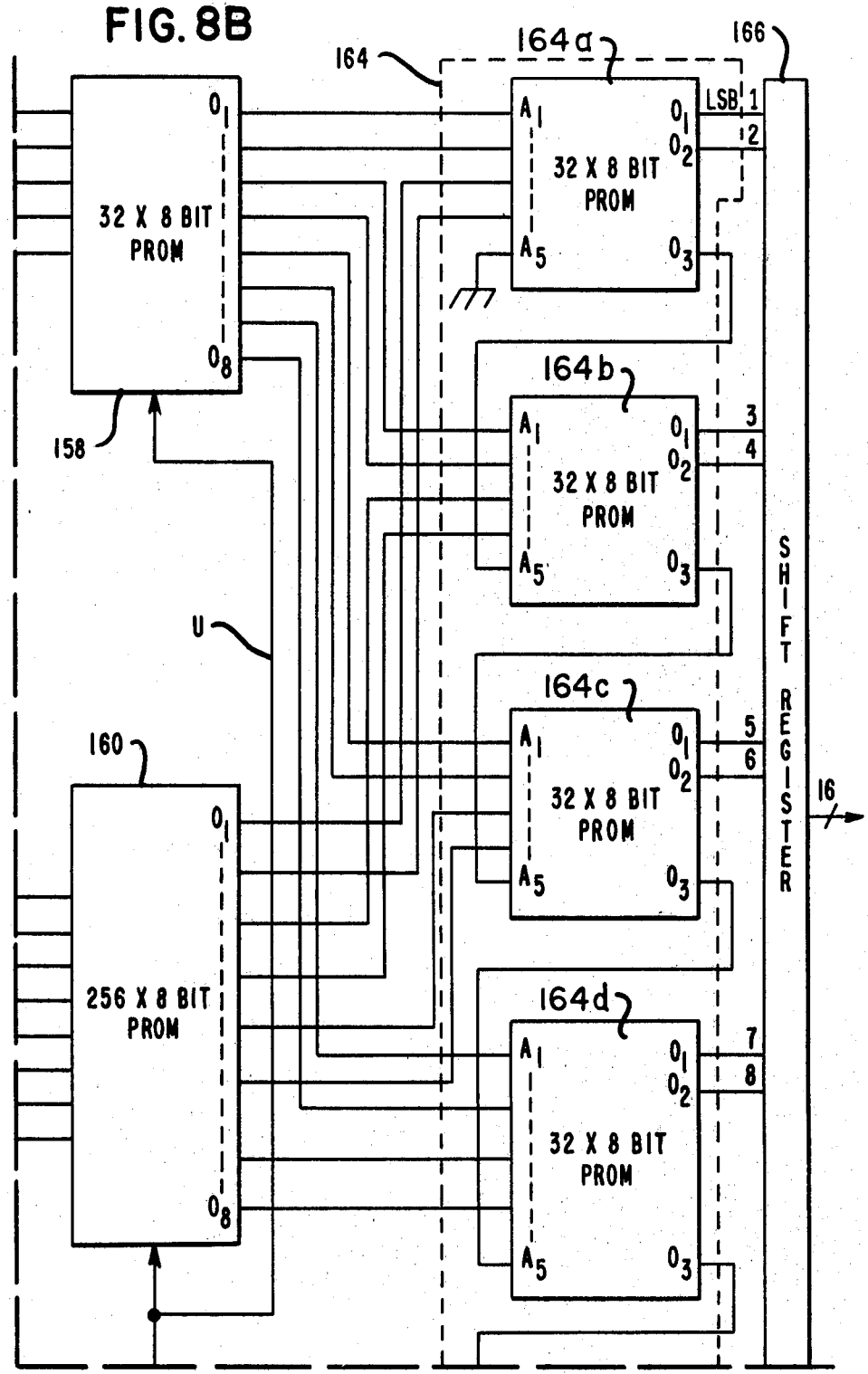
Figure 8C:
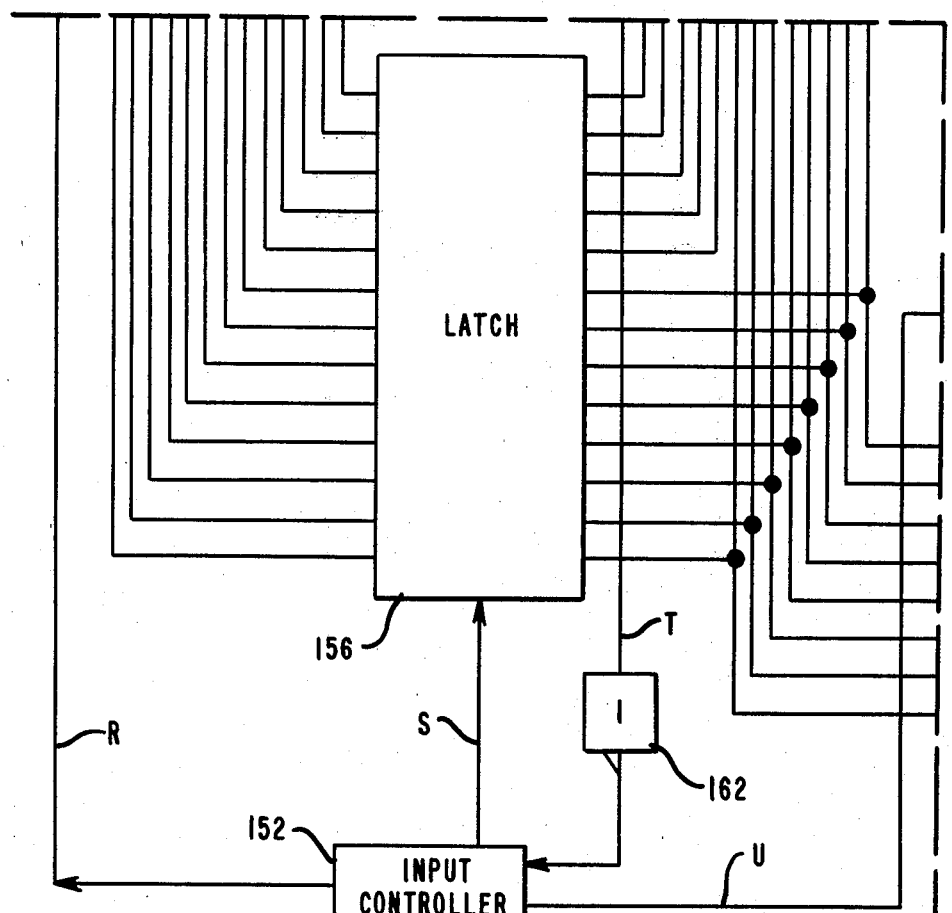
Figure 8:
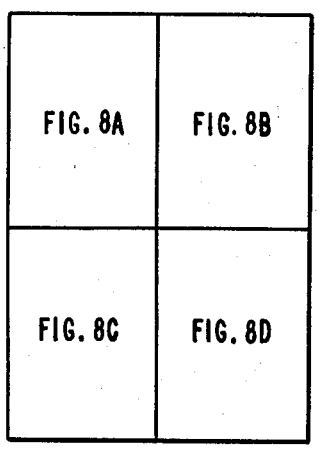
Figure 8D:
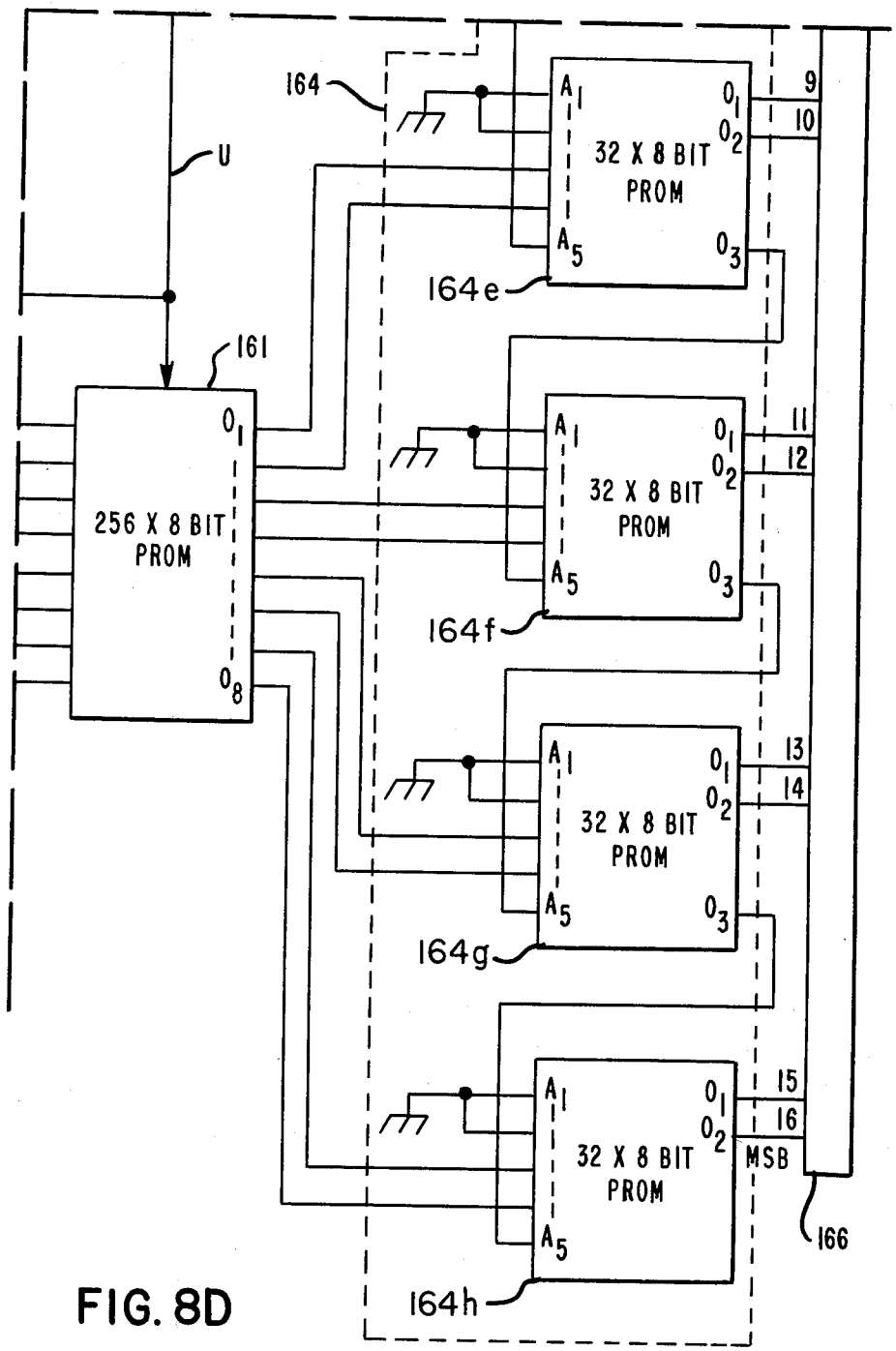
Figure 9:
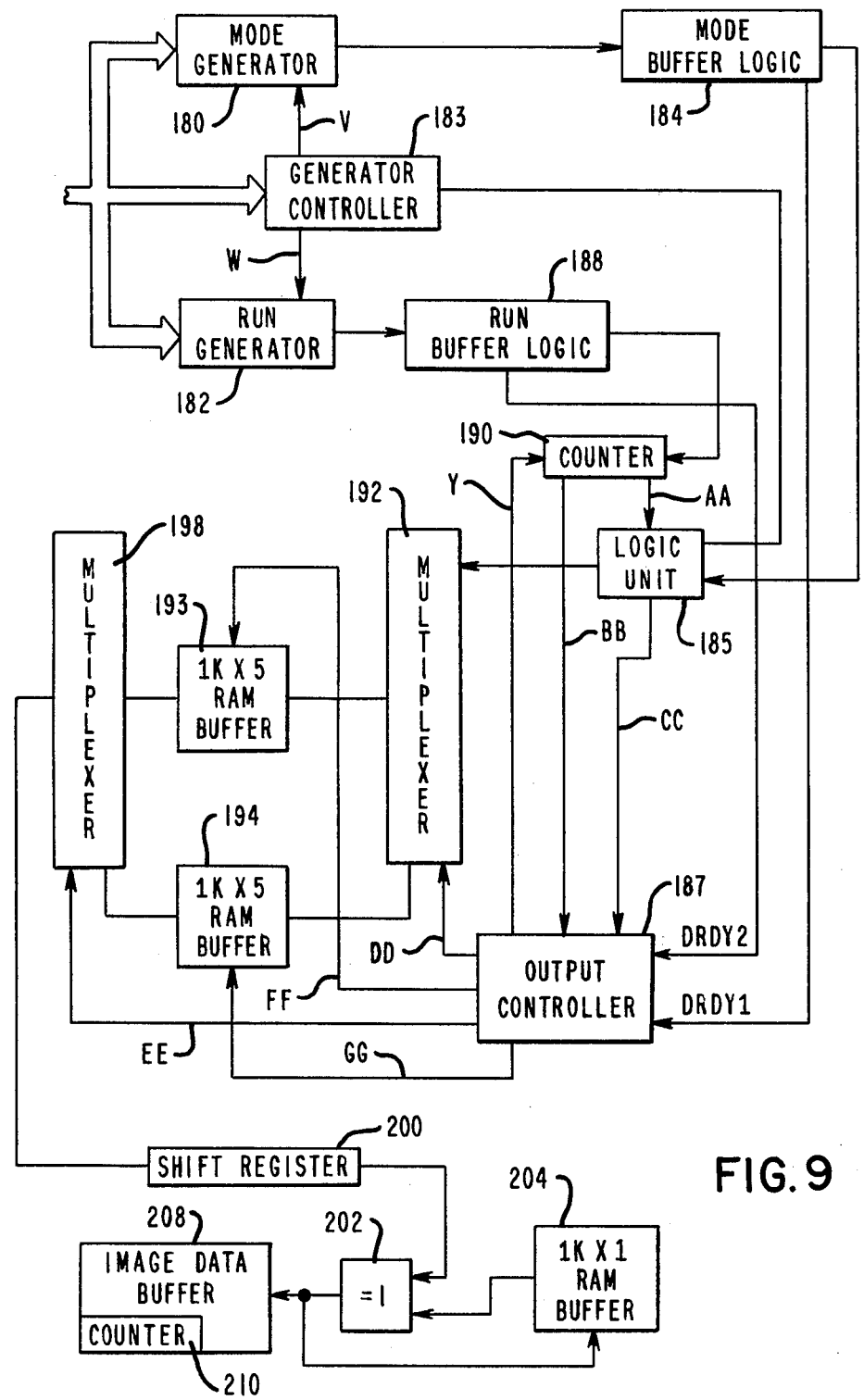
FIG. 9 shows a detailed block diagram for decompressing the sixteen bit ternary octade symbol into the modes and runs used in the preferred embodiment.

A detailed representation of the decompressor 16 (FIG. 1) is shown in FIGS. 8A-D and 9. FIGS. 8A-D show the decoding of the thirteen bit ternary octade symbol and its conversion to a sixteen bit ternary octade symbol, while FIG. 9 shows the transformation of the sixteen bit ternary octade symbol into eight binary bits and the generation of modes and run information, along with reconstruction of the original image. Referring now to FIG. 8A, the byte of data from the compressor 12 (FIG. 1) is transmitted via transmission medium 14 (FIG. 1) to a shift register 150. Shift register 150, a parallel in-serial out device, is clocked by a signal R from an input controller 152 (FIG. 8C). The serial bit output from shift register 150 is transmitted to a PROM 154. PROM 154, which is a 16K×16 bit device, contains the actual 13 bit ternary octade symbols corresponding to the variable length code words which are outputted from compressor 12 (FIG. 1).

The output of PROM 154 is connected to a data latch 156 (FIG. 8C), and also to a set of PROMs 158 (FIG. 8B), 160 (FIG. 8B), and 161 (FIG. 8D). Latch 156, which is enabled by a signal S from controller 152, feeds back the outputs of PROM 154 to the inputs of the same PROM 154, with each output bit of latch 156 shifted down one position from the least significant bit. A new least significant bit is then clocked out of shift register 150 by signal R for the fourteen bit address to the PROMs.

When a valid symbol is outputted from PROM 154, a signal T (the fourteenth bit of PROM 154 output) is transmitted to controller 152 from PROM 154 via an inverter 162. Controller 152 then transmits signal U, enabling PROMs 158, 160, and 161. The five least significant output bits of PROM 154 are used to address PROM 158, while the eight most significant bits of the PROM 154 output address PROMs 160 and 161 in parallel.

PROM 158, a 32×8 bit device, transmits an eight bit output to inputs of an adder 164. PROMs 160 and 161, which are 256×8 bit devices, each transmit an eight bit output to inputs of adder 164. Adder 164, a MODULO-3 adder, is shown in detail in FIGS. 8B and 8D.

Referring now to FIG. 8B, the eight bit outputs $O_1$-$O_8$ from PROMs 158 and 160 are transmitted to input ports of a set of PROMs 164$a$-$d$. The $O_1$ and $O_2$ outut bits of PROM 158 are connected to address bits $A_1$ and $A_2$ of PROM 164$a$, while the $O_1$ and $O_2$ output bits of PROM 160 are connected to the $A_3$ and $A_4$ address bits of PROM 164$a$. The $A_5$ address bit of PROM 164$a$ is connected to ground.

The $O_3$ and $O_4$ output bits of PROM 158 are connected to the $A_1$ and $A_2$ address bits of PROM 164$b$, while the $O_3$ and $O_4$ output bits of PROM 160 are connected to the $A_3$ and $A_4$ address bits of PROM 164$b$. The $A_5$ address bit of PROM 164$b$ is connected to the $O_3$ output bit of PROM 164$a$.

The $O_5$ and $O_6$ output bits of PROM 158 are connected to the $A_1$ and $A_2$ address bits of PROM 164$c$, while the $O_5$ and $O_6$ output bits of PROM 160 are connected to the $A_3$ and $A_4$ address bits of PROM 164c. The $A_5$ address bit of PROM 164c is connected to the $O_3$ output bit of PROM 164b.

The $O_7$ and $O_8$ output bits of PROM 158 are connected to the $A_1$ and $A_2$ address bits of PROM 164d, while the $O_7$ and $O_8$ output bits of PROM 160 are connected to the $A_3$ and $A_4$ address bits of PROM 164d. The $A_5$ address bits of PROM 164d is connected to the $O_3$ output bit of PROM 164c.

Referring now to FIG. 8D, the $O_1$ and $O_2$ output bits of PROM 161 are connected to the $A_3$ and $A_4$ address bits of PROM 164e; the $O_3$ and $O_4$ output bits of PROM 161 are connected the $A_3$ and $A_4$ address bits of PROM 164f; the $O_5$ and $O_6$ bits of PROM 161 are connected to the $A_3$ and $A_4$ address bits of PROM 164g; and the $O_7$ and $O_8$ bits of PROM 161 are connected to the $A_3$ and $A_4$ address bits of PROM 164h. The $A_1$ and $A_2$ bits of PROMs 164e-h are connected to ground.

The $A_5$ address bit of PROM 164e is connected to the $O_3$ output bit of PROM 164d (FIG. 8B); the $A_5$ address bit of PROM 164f is connected to the $O_3$ output bit of PROM 164e; the $A_5$ address bit of PROM 164g is connected to the $O_3$ output bit of PROM 164f; and the $A_5$ address bit of PROM 164h is connected to the $O_3$ output bit of PROM 164g.

The $O_1$ and $O_2$ output bits of PROMs 164a-h are connected in parallel to a shift register 166, with the $O_1$ output bit of PROM 164a being the least significant bit of the sixteen bit ternary octade symbol formed by shift register 166, and the $O_2$ output bit of PROM 164h being the most significant bit of the sixteen bit ternary octade symbol, where each pair of two bits of shift register 166 represents a ternary digit value.

In operation, as each thirteen bit octade symbol is transmitted to PROMs 158, 160, and 161 from decoder PROM 154, the special arrangement and contents of PROMs 164a-h cause the corresponding sixteen bit ternary octade number to be outputted to shift register 166. A chart listing the actual contents of PROMs 164a-h is shown in FIG. 10.

The sixteen bit output of shift register 166 is transmitted serially to a five bit mode generator 180 (FIG. 9) and a ten bit run generator 182. These generators provide the actual binary lengths for the modes and runs, respectively. The output of shift register 166 is also transmitted to a generator controller 183. Controller 183 is used to separate the run data from the mode data.

In operation, controller 183 receives the sixteen bit ternary octade number from shift register 166. If the two binary bits which comprise a ternary number represent a decimal value of two, controller 183 transmits a signal V to enable mode generator 180. Signal V is present until controller 183 detects a decimal value of zero for two input bits, at which time controller 183 transmits a signal W to run generator 182. Signals V and W will alternate until all the data from shift register 166 has been processed.

Generators 180 and 182 operate according to the following rules for each of the two input bit pairs converted into a ternary digit. If the first ternary digit is a two, the binary value of the mode is generated by generator 180 for each ternary digit until the ternary digit zero is encountered. Generator 180 outputs a binary digit one for each ternary digit two, and a binary digit zero for each ternary digit one encountered; when a ternary digit zero is encountered, the binary value of the run length is generated by generator 182 until the ternary digit two is encountered. At run generator 182, each ternary digit zero is replaced by a binary digit one, and each ternary digit one is replaced by a binary zero. This decoding procedure continues until all mode and run symbols generated from the original image have been decoded.

The output of the mode generator 180 is transmitted to a mode buffer logic unit 184. Buffer logic unit 184 receives the binary value representing the mode and subtracts one from this quantity. The mode value is then converted to a five bit quantity by inserting additional zero bits in the most significant digit positions, if required. These five bits are then transmitted in parallel to a degeneration logic unit 185 to reconstruct the five line band. At this time, buffer logic unit 184 also transmits a data ready signal DRDY1 to an output controller 187.

The output of generator 182 is transmitted to a run buffer logic unit 188. Buffer logic unit 188 receives the binary value representing the run, and converts this quantity to a 10 bit number by inserting additional zeros in the most significant bit position, if required. These ten bits are transmitted in parallel to a counter 190, and a ready signal DRDY2 is then transmitted to controller 187 by logic unit 188.

When controller 187 has received both ready signals DRDY1 and DRDY2 from buffer logic units 184 and 188, it transmits a series of pulses Y to counter 190. When counter 190, which is a ten bit down counter, receives the ten bit run value from buffer logic unit 188, it transmits a signal AA to logic unit 185 for each pulse Y received from controller 187 until the contents of counter 190 equals zero. Each pulse of signal AA causes logic unit 185 to output the parallel five bit mode quantity obtained from buffer logic 184 to a multiplexer 192. Multiplexer 192 outputs the five bit mode data to either of two five line buffers 193 and 194.

When counter 190 has counted down to zero, it transmits a signal BB to controller 187, which halts the pulse train Y. Buffer logic unit 184 then outputs the next five bit mode to logic unit 185, and buffer logic unit 188 loads counter 190 with the corresponding ten bit run length of that mode.

Logic unit 185 outputs a signal CC to controller 187 for each five bit mode it outputs to multiplexer 192, which also decrements the contents of counter 190 by one. When controller 187 transmits a signal DD to multiplexer 192, it causs its five bit output to be transmitted in parallel to either buffer 193 or 194, depending on which buffer is being used as a write buffer at that time, resulting in the reconstruction of a five line band in the appropriate buffer.

The outputs of buffers 193 and 194 are transmitted to a multiplexer 198, which is controlled by a signal EE from controller 187. The two five line buffers 193 and 194 function as a set of read and write buffers which are alternated for every five scan lines of data.

Buffers 193 and 194, each of which is able to store 5 lines of data from the image, are controlled by signals FF and GG respectively from controller 187. Signal FF causes one line of data read from buffer 193 to be transmitted in parallel to a shift register 200 via multiplexer 198, at which time signal GG controls the WRITE operation of buffer 194. Shift register 200, a parallel in-serial out device, outputs each pixel serially to one input of an EXCLUSIVE-OR gate 202. The output of gate 202 is transmitted to a $1K \times 1$ bit buffer RAM 204, which stores one line of image data. The output of RAM 204 is transmitted pixel by pixel to the second input of gate 202 to re-introduce the line-to-line redundancy and regenerate the original image scan line, which is merely the reverse of the process described previously with respect to compressor 12.

The decompressed pixels are transmitted serially from gate 202 to an image scan line data buffer 208, and as the data enters buffer 208, each pixel is counted by a counter 210. The size of counter 210 is equal to the number of pixels in one scan line of the original image. When counter 210 has counted to its maximum, it places the next pixel received by buffer 208 in a new scan line. Counter 210 then begins a new count, and this technique continues for all the scan line data buffer 208 receives. In this manner, the decompressed image is reconstructed in buffer 208 to appear exactly as the original image.

When the decompression process is complete, the decompressed image is transmitted from buffer 208 to an output device 18 (FIG. 1), where it can be displayed on a CRT screen or printed on a hard copy unit.

While the invention has been shown and described in terms of a preferred embodiment thereof, it will be understood that this invention is not limited to this particular embodiment and that many changes and modifications may be made without departing from the true spirit and scope of the invention as defined in the appended claims.

I claim:

1. An apparatus for the processing of digital data derived from an image, comprising:
    means for separating said digital data into a plurality of data bands, with each of said data bands comprising a predetermined number of scan lines from said image;
    first means for generating a plurality of first symbols, with each of said first symbols representative of a binary value of a series of data bits contained within a specific bit position in each of said scan lines within said data band;
    second means for generating a plurality of second symbols, with each of said second symbols representing a number indicative of consecutive occurrences of an associated first symbol;
    third means for generating a plurality of third symbols, with each of said third symbols comprising a section of data representing a first symbol and a section of data representing a second symbol, where said second symbol is associated with said first symbol;
    and means for generating a plurality of code words representative of each of said third symbols.

2. The apparatus of claim 1, wherein said separating means includes a plurality of first storage means, each capable of storing a predetermined number of scan lines from said image.

3. The apparatus of claim 1, wherein said first means includes
    second storage means for storing a single first symbol,
    and comparison means, coupled to the input and output of said second storage means, for generating a first signal when successive first symbols are identical.

4. The apparatus of claim 3, wherein said second means is incremented upon generation of said first signal from said comparison means.

5. The apparatus of claim 1, wherein said first and second symbols consist of binary digits.

6. The apparatus of claim 1, wherein said third means includes
    first ternary encoding means for transforming said first symbols into first ternary symbols,
    and second ternary encoding means for transforming said second symbols into second ternary symbols.

7. The apparatus of claim 6, wherein said third means further includes means for generating a third ternary symbol, with each of said third ternary symbols comprising a section of data representing a first ternary symbol and a section of data representing a second ternary symbol, where said second ternary symbol is associated with said first ternary symbol.

8. An apparatus for the processing of digital data derived from an image, comprising:
    means for separating said digital data into a plurality of data bands, with each of said data bands comprising a predetermined number of scan lines from said image;
    first formation means, coupled to said separating means, for forming a plurality of first symbols, with each of said first symbols representative of a binary value of a series of data bits contained within a specific bit position in each of said scan lines within said data band;
    counting means, responsive to said first formation means, for generating a plurality of second symbols, with each of said second symbols representing a number indicative of consecutive occurrences of an associated first symbol within said first formation means;
    second formation means, coupled to said first formation means and said counting means, for forming a plurality of third symbols, with each of said third symbols comprising a section of data representing a first symbol from said first formation means and a section of data representing a second symbol from said counting means, where said second symbol is associated with said first symbol;
    first storage means for storing a plurality of code words which are representative of each of said third symbols;
    means for causing the generation of code words from said first storage means;
    and means for outputting said generated code words over a transmission medium.

9. The apparatus of claim 8, wherein said separating means includes a plurality of second storage means, each capable of storing a predetermined number of scan lines from said image.

10. The apparatus of claim 8, wherein said first formation means includes
    third storage means for storing a single first symbol,
    and comparison means, coupled to the input and output of said third storage means, for generating a first signal when successive first symbols are identical.

11. The apparatus of claim 10, wherein said counting means is incremented upon generation of said first signal from said comparison means.

12. The apparatus of claim 8, wherein said first and second symbols consist of binary digits.

13. The apparatus of claim 8, wherein said second formation means includes
    first ternary encoding means for transforming said first symbols into first ternary symbols,
    and second ternary encoding means for transforming said second symbols into second ternary symbols.

14. The apparatus of claim 13, wherein said second formation means further includes means for generating a third ternary symbol, with each of said third ternary symbols comprising a section of data representing a first ternary symbol and a section of data representing a second ternary symbol, where said second ternary symbol is associated with said first ternary symbol.

15. The apparatus of claim 14, wherein said third ternary symbol comprises sixteen data bits.

16. The apparatus of claim 15, wherein said second formation means further includes means for compressing said third ternary symbol from sixteen data bits to thirteen data bits.

17. The apparatus of claim 16, wherein said compression means comprises a plurality of two bit full adders.

18. The apparatus of claim 8, further comprising:
means for receiving said code words from said transmission medium;
means, responsive to said receiving means, for storing said code words;
symbol storage means for storing a plurality of fourth symbols which are representative of each of said code words, wherein each of said fourth symbols comprises a section of data representing said first symbol, and a section of data representing said second symbol;
means for separating said fourth symbols into said first symbols and said second symbols;
first conversion means for converting each of said first symbols into a series of data bits indicative of the data contained in a specific bit position in each of said scan lines within a data band;
second conversion means for converting each of said second symbols to a number indicative of the consecutive occurrences of its associated first symbol within said first formation means;
means for outputting from said first conversion means each of said series of data bits, wherein each of said series is outputted once for a number equal to the quantity stored within said second conversion means;
and means for converting said data bits into a digital data image.

19. The apparatus of claim 18, wherein said means for separating said fourth symbols comprises a MODULO-3 adder.

20. An apparatus for the processing of digital data derived from an image, comprising:
means for separating said digital data into a plurality of data bands, with each of said data bands comprising a predetermined number of scan lines from said image;
first formation means, coupled to said separating means, for forming a plurality of mode symbols, with each of said mode symbols representative of a binary value of a series of data bits contained within a specific bit position in each of said scan lines within said data band;
counting means, responsive to said first formation means, for generating a plurality of run symbols, with each of said run symbols representing a number indicative of consecutive occurrences of an associated mode symbol within said first formation means;
second formation means, coupled to said first formation means and said counting means, for forming a plurality of combination symbols, with each of said combination symbols comprising a section of data representing a mode symbol from said first formation means and a section of data representing a run symbol from said counting means, where said run symbol is associated with said mode symbol;
first storage means for storing a plurality of code words which are representative of each of said combination symbols;
means for causing the generation of code words from said storage means; and
means for outputting said generated code words over a transmission medium.

21. A method of processing digital data derived from an image, comprising the steps of:
(a) separating said digital data into data bands, wherein each of said data bands comprises a predetermined number of scan lines from said image;
(b) generating a plurality of first symbols, with each of said first symbols representative of a binary value of a series of data bits contained within a specific bit position in each of said scan lines within said data band;
(c) generating a plurality of second symbols, with each of said second symbols representing a number indicative of consecutive occurrences of an associated first symbol;
(d) generating a pluralty of third symbols, with each of said third symbols comprising a section of data representing a first symbol and a section of data representing a second symbol, where said first symbol is associated with said second symbol; and
(e) generating a plurality of code words representative of each of said third symbols.

22. A method of processing digital data derived from an image, comprising the steps of:
(a) receiving a continuous stream of data bits which are derived from said image;
(b) storing a plurality of said data bits in a first storage means, wherein said first storage means separates said data bits into a plurality of data bands, with each of said data bands comprising a predetermined number of scan lines from said image;
(c) forming a plurality of first symbols using said data bits from said first storage means, with each of said first symbols representing a binary value of a series of data bits contained in a specific bit position in each of said scan lines within said first storage means;
(d) forming a plurality of second symbols, with each of said second symbols representing a number indicative of consecutive occurrences of an associated second symbol within said first storage means;
(e) forming a plurality of third symbols from said first and second symbols, where each of said third symbols contain a section of data representing said first symbol and a section of data representing said second signal, where said second signal is associated with said first symbol;
(f) inputting each of said third symbols to a second storae means as an address thereof;
(g) outputting from said second storage means a code word representative of each of said third symbols which are inputted; and
(h) transmitting said code words over a transmission medium.

23. The method of claim 22, wherein the step of storing a plurality of said data bits in said first storage means comprises the step of further separating said data bits into a plurality of third storage means, each capable of storing a predetermined number of scan lines from said image.

24. The method of claim 23, wherein the step of forming a plurality of first symbols includes the steps transforming said first symbols into a plurality of first ternary symbols.

25. The method of claim 24, wherein the step of forming a plurality of second symbols includes the step of transforming said second symbols into a plurality of second ternary symbols.

26. The method of claim 25, wherein the step of forming a plurality of third symbols includes the steps of:
   (a) transforming said third symbols into a plurality of third ternary symbols, each of which contain sixteen data bits;
   (b) and compressing said third ternary symbols from sixteen data bits to thirteen data bits.

27. The method of claim 22, further comprising the steps of:
   (i) receiving said code words from said transmission medium,
   (j) storing said code words as they are received;
   (k) inputting said code words to a fourth storage means as an address thereof;
   (l) outputting from said fourth storage means a fourth symbol representative of each of said code words which are inputted;
   (m) separating each of said fourth symbols into a section representing said first symbol and an associated section representing said second symbol;
   (n) converting each of said first symbols into a series of data bits indicative of the data contained in a specific bit position in each of said scan lines within a data band;
   (o) converting each of said second symbols to a number indicative of the consecutive occurrences of its associated first symbol within said first storage means;
   (p) outputting once each of said series of data bits for each number of consecutive occurrences obtained in step (o); and
   (q) converting said data bits into a digital image.

* * * * *